United States Patent
Faxér et al.

(10) Patent No.: US 12,004,210 B2
(45) Date of Patent: Jun. 4, 2024

(54) TRIGGERING OF APERIODIC CHANNEL STATE INFORMATION REFERENCE SIGNALS WITH MIXED NUMEROLOGY

(71) Applicant: TELEFONAKTIEBOLAGET LM ERICSSON (PUBL), Stockholm (SE)

(72) Inventors: Sebastian Faxér, Stockholm (SE); Sorour Falahati, Stockholm (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 434 days.

(21) Appl. No.: 17/298,890

(22) PCT Filed: Dec. 2, 2019

(86) PCT No.: PCT/IB2019/060375
§ 371 (c)(1),
(2) Date: Jun. 1, 2021

(87) PCT Pub. No.: WO2020/110098
PCT Pub. Date: Jun. 4, 2020

(65) Prior Publication Data
US 2022/0039099 A1 Feb. 3, 2022

Related U.S. Application Data

(60) Provisional application No. 62/774,091, filed on Nov. 30, 2018.

(51) Int. Cl.
*H04W 72/23* (2023.01)
*H04L 5/00* (2006.01)
(Continued)

(52) U.S. Cl.
CPC ......... *H04W 72/542* (2023.01); *H04L 5/0051* (2013.01); *H04L 27/26025* (2021.01); *H04W 72/0446* (2013.01); *H04W 72/23* (2023.01)

(58) Field of Classification Search
CPC ........... H04L 27/26025; H04L 5/0051; H04W 72/23; H04W 74/0446
(Continued)

(56) References Cited

U.S. PATENT DOCUMENTS

2023/0247623 A1* 8/2023 Hao ...................... H04W 72/02
370/329

OTHER PUBLICATIONS

3GPP, "3rd Generation Partnership Project; Technical Specification Group Radio Access Network; NR; Physical layer procedures for data (Release 15)", TS 38.214 V15.3.0, Sep. 2018.
(Continued)

*Primary Examiner* — Dang T Ton

(57) ABSTRACT

Devices, systems, and methods described herein may improve aperiodic CSI-RS handling in mixed numerology environments. An exemplary method includes operations of receiving a downlink control information (DCI) message carried by a Physical Downlink Control Channel (PDCCH) on a second carrier, wherein the second carrier uses a second OFDM numerology, obtaining an aperiodic CSI-RS slot offset from the DCI message, determining a reference slot in the first numerology, determining the slot of the aperiodic CSI-RS based on the reference slot and the aperiodic CSI-RS slot offset, and receiving or transmitting the aperiodic CSI-RS in the determined slot.

20 Claims, 11 Drawing Sheets

(51) Int. Cl.
    *H04L 27/26*       (2006.01)
    *H04W 72/0446*    (2023.01)
    *H04W 72/542*     (2023.01)

(58) Field of Classification Search
    USPC .............................. 370/401, 329, 403, 405
    See application file for complete search history.

(56)            References Cited

OTHER PUBLICATIONS

3GPP, "3rd Generation Partnership Project; Technical Specification Group Radio Access Network; NR; Physical layer procedures for data (Release 15)", TS38.214, V15.1.0, Mar. 2018.
Intel Corporation, "Remaining issues on CSI reporting", 3GPP TSG RAN WG1 #93, R1-1806506, May 21-25, 2018, Busan, South Korea.
Qualcomm Incorporated, "Maintenance for CSI Reporting", 3GPP TSG RAN WG1 Meeting #92bis, R1-1804786, Apr. 16-20, 2018, Sanya, China.

* cited by examiner

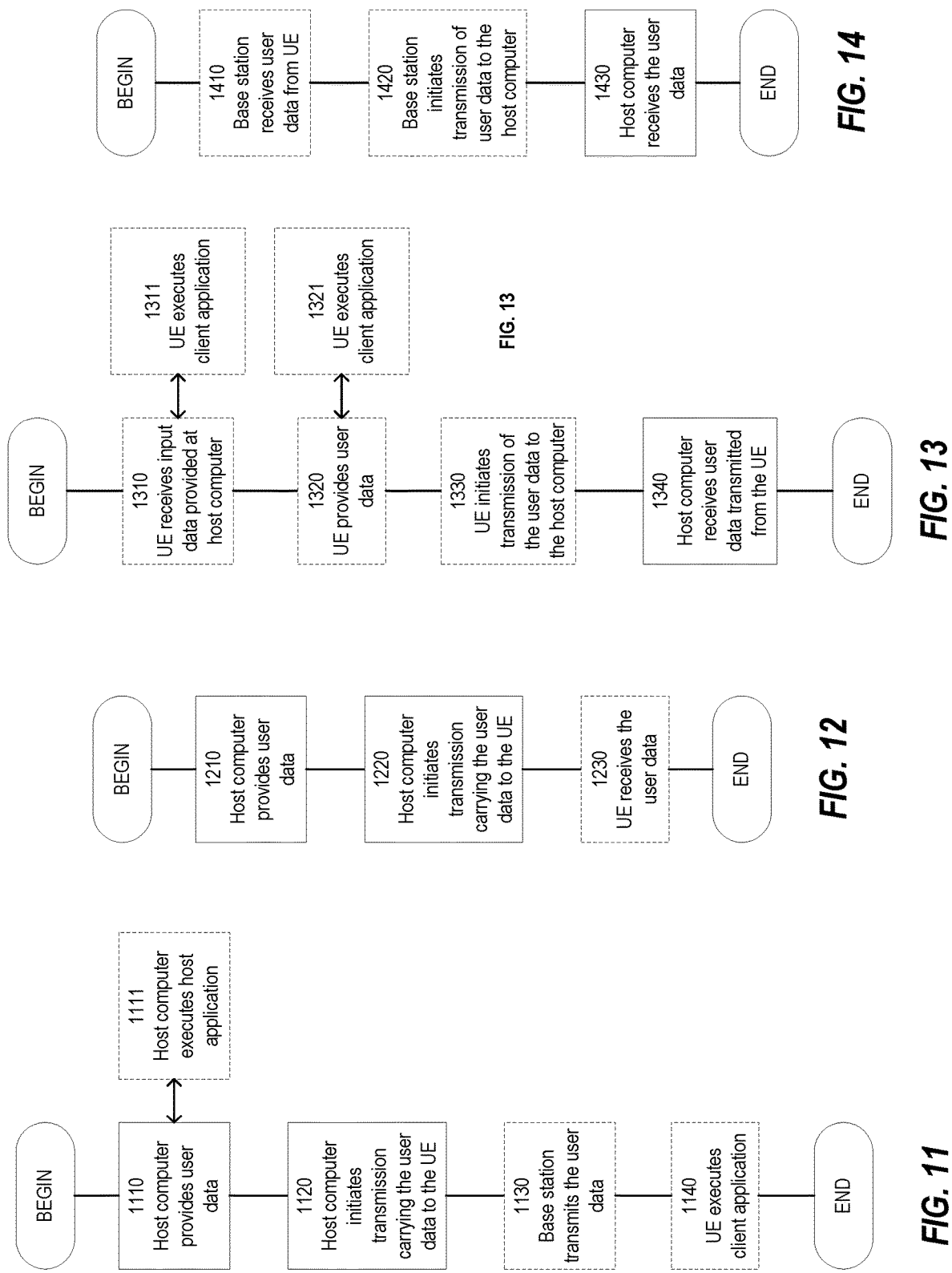

TRIGGERING OF APERIODIC CHANNEL STATE INFORMATION REFERENCE SIGNALS WITH MIXED NUMEROLOGY

RELATED APPLICATIONS

This application is a national stage application of International Patent Application No. PCT/IB2019/060375, filed Dec. 2, 2019, and claims priority to and the benefit of U.S. Provisional Application No. 62/774,091, filed on Nov. 30, 2018 and entitled "TRIGGERING OF APERIODIC CHANNEL STATE INFORMATION REFERENCE SIGNALS WITH MIXED NUMEROLOGY," the disclosures of which are incorporated in their entirety by reference.

TECHNICAL FIELD

The present disclosure generally relates to the field of wireless network communications, and more particularly, to deploying aperiodic channel state information reference signals in mixed numerology environments.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

BACKGROUND

The next generation mobile wireless communication system (5G) or new radio (NR), supports a diverse set of use cases and a diverse set of deployment scenarios. Some deployment scenarios include deployment at both low frequencies (100s of MHz), similar to LTE today, and very high frequencies (mm waves in the tens of GHz).

Similar to LTE, NR uses orthogonal frequency division multiplexing (OFDM) in the downlink (i.e., from a network node, gNB, eNB, or base station, to a user equipment (UE). In the uplink (i.e., from UE to gNB), both discrete Fourier transform spread (DFT-spread) OFDM and OFDM is supported.

The basic NR physical resource can thus be seen as a time-frequency grid as illustrated in FIG. 1, where each resource element corresponds to one OFDM subcarrier during one OFDM symbol interval. Resource allocation in a slot is described in terms of resource blocks (RBs) in the frequency domain and number of OFDM symbols in the time domain. An RB corresponds to 12 contiguous subcarriers and a slot consists of 14 OFDM symbols.

Different subcarrier spacing values are supported in NR. The supported subcarrier spacing values (also referred to as numerologies) in NR are given by $\Delta f=(15 \times 2^\mu)$ kHz where $\mu=0,1,2,3,4$. The possible subcarrier spacings are summarized in Table 1.

TABLE 1

Slot length at different numerologies.

| Numerology | Slot length | RB BW |
| --- | --- | --- |
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the time domain, downlink and uplink transmissions in NR are organized into equally-sized subframes, similar to LTE, as shown in FIG. 2. A subframe is further divided into slots and the number of slots per subframe is $2^\mu$ for a numerology of $(15 \times 2^\mu)$ kHz.

NR supports "slot based" transmission. In each slot, the gNB transmits downlink control information (DCI) about which UE data is to be transmitted to and what resources in the current downlink slot the data is transmitted on. The DCI is carried on the Physical Control Channel (PDCCH) and data is carried on Physical Downlink Shared Channel (PDSCH).

SUMMARY

One general aspect includes a method. The method also includes receiving a downlink control information (DCI) message carried by a physical downlink control channel (PDCCH) on a second carrier, where the second carrier uses a second OFDM numerology; obtaining an aperiodic CSI-RS slot offset from the DCI message, determining a reference slot in the first numerology, determining the slot of the aperiodic CSI-RS based on the reference slot and the aperiodic CSI-RS slot offset, and receiving or transmitting the aperiodic CSI-RS in the determined slot. Other embodiments of this aspect include corresponding computer systems, apparatus, and computer programs recorded on one or more computer storage devices, each configured to perform the actions of the methods.

Implementations may include one or more of the following features. The method where the first OFDM numerology is different from the second OFDM numerology. The OFDM numerology is characterized by its subcarrier spacing. The method where additionally the wireless device transmits a channel state information (CSI) report based on a measurement of the received aperiodic CSI-RS. The slot of the aperiodic CSI-RS is determined as the slot X slots later than the reference slot, where X is the aperiodic CSI-RS slot offset. The slot of the aperiodic CSI-RS is determined as the slot X slots later than the reference slot, where X is the aperiodic CSI-RS slot offset. Implementations of the described techniques may include hardware, a method or process, or computer software on a computer-accessible medium.

One general aspect includes a user equipment (UE) for receiving an aperiodic CSI-RS on a first carrier. The user equipment also includes an antenna configured to send and receive wireless signals; radio front-end circuitry connected to the antenna and to processing circuitry, and configured to condition signals communicated between the antenna and the processing circuitry; the processing circuitry being configured to perform operations may include: receiving a downlink control information (DCI) message carried by a physical downlink control channel (PDCCH) on a second carrier, where the second carrier uses a second OFDM numerology; obtaining an aperiodic CSI-RS slot offset from the DCI message; determining, on the first carrier, a reference slot in the first numerology; determining the slot of the aperiodic CSI-RS based on the reference slot and the aperiodic CSI-RS slot offset; and receiving the aperiodic CSI-RS in the determined slot of the aperiodic CSI-RS or transmitting an associated CSI-RS report in the determined slot. The equipment also includes a battery connected to the processing circuitry and configured to supply power to the UE. Other embodiments of this aspect include corresponding computer systems, apparatus, and computer programs recorded on one or more computer storage devices, each configured to perform the actions of the methods.

Implementations may include one or more of the following features. The user equipment where the first OFDM numerology is different from the second OFDM numerology. The OFDM numerology is characterized by its subcarrier spacing. The user equipment where the wireless device transmits a channel state information (CSI) report based on a measurement of the received aperiodic CSI-RS. Implementations of the described techniques may include hardware, a method or process, or computer software on a computer-accessible medium.

One general aspect includes a communication system. The communication system includes processing circuitry configured to provide user data; and a communication interface configured to forward the user data to a cellular network for transmission to a user equipment (UE), where the cellular network may include at least one base station having a radio interface and processing circuitry, the processing circuitry being configured to transmit CSI-RS information aperiodically on a first carrier according to a first numerology and on a second carrier according to a second numerology. Other embodiments of this aspect include corresponding computer systems, apparatus, and computer programs recorded on one or more computer storage devices, each configured to perform the actions of the methods.

Implementations may include one or more of the following features. The communication system where the at least one base station may include a first base station and a second base station, where the first base station transmits via the first carrier and the second base station transmits via the second carrier. The first base station and the second base station are non-collocated base stations. The UE is configured to communicate with the base station. Implementations of the described techniques may include hardware, a method or process, or computer software on a computer-accessible medium.

One general aspect includes a method. The method also includes transmitting a downlink control information (DCI) message carried by a physical downlink control channel (PDCCH) on a second carrier, where the DCI message includes an aperiodic CSI-RS slot offset; transmitting the aperiodic CSI-RS in the determined slot of the aperiodic CSI-RS according to the aperiodic CSI-RS slot offset. Other embodiments of this aspect include corresponding computer systems, apparatus, and computer programs recorded on one or more computer storage devices, each configured to perform the actions of the methods.

Implementations may include one or more of the following features. The method where the first carrier uses a first OFDM numerology and the second carrier uses a second OFDM numerology that is different than the first OFDM numerology. The first OFDM numerology and the second OFDM numerology are characterized by respective subcarrier spacings. The method may include receiving, from a wireless device, a channel state information (CSI) report based on a measurement of the received aperiodic CSI-RS. The slot of the aperiodic CSI-RS is determined as the slot X slots later than the reference slot, where X is the aperiodic CSI-RS slot offset. Implementations of the described techniques may include hardware, a method or process, or computer software on a computer-accessible medium.

BRIEF DESCRIPTION OF DRAWINGS

FIG. 11: Methods implemented in a communication system including a host computer, a base station and a user equipment in accordance with some embodiments.
FIG. 12: Methods implemented in a communication system including a host computer, a base station and a user equipment in accordance with some embodiments.
FIG. 13: Methods implemented in a communication system including a host computer, a base station and a user equipment in accordance with some embodiments.
FIG. 14: Methods implemented in a communication system including a host computer, a base station and a user equipment in accordance with some embodiments.

Figure 1:
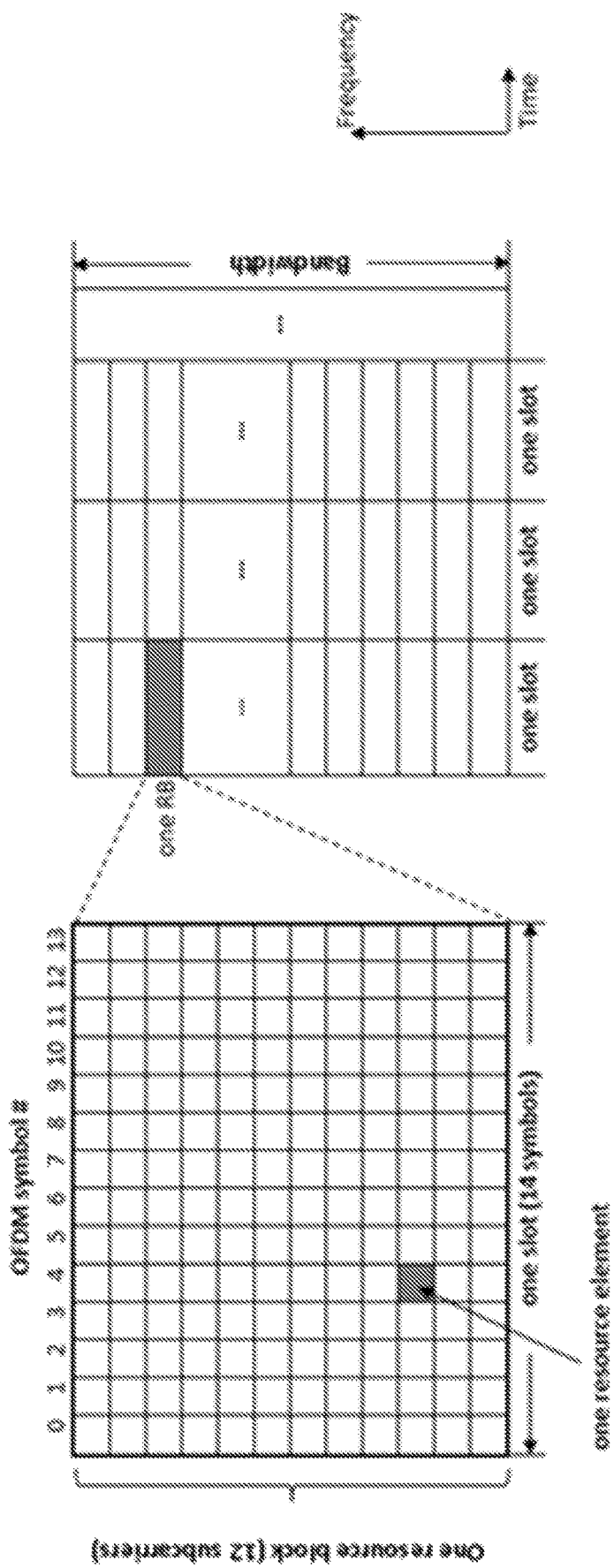
FIG. 1: An example of NR physical resources.
Figure 2:
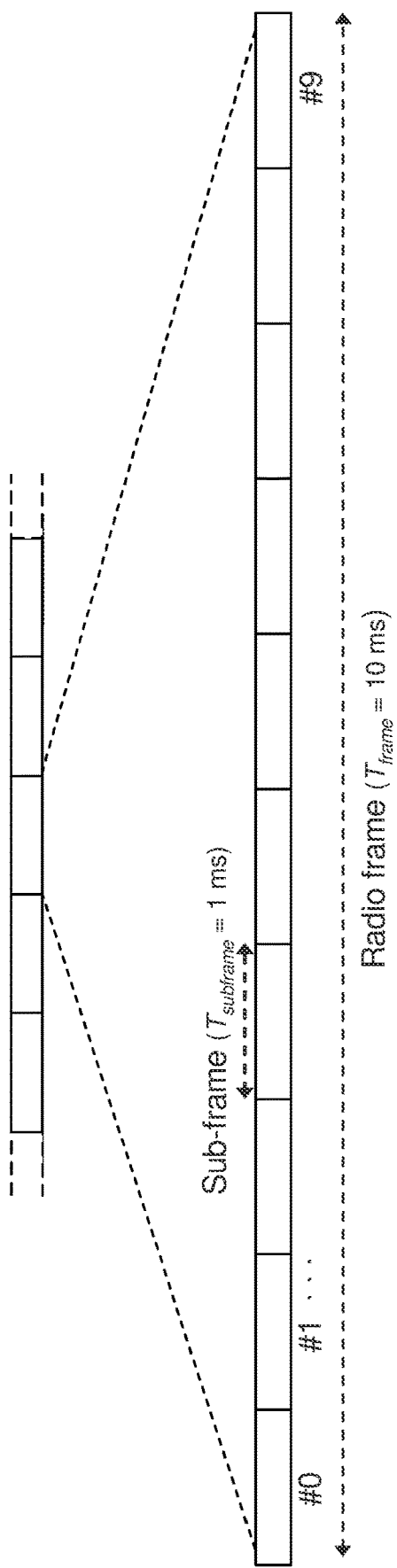
FIG. 2: NR time-domain structure with 15 kHz subcarrier spacing.

These figures will be better understood by reference to the following detailed description.

DETAILED DESCRIPTION

The PDCCH is typically transmitted in control resource sets (CORSETs) in the first few OFDM symbols in each slot. In operation, a UE may first decode PDCCH and, if a PDCCH is decoded successfully, though UE may then decode the corresponding PDSCH based on the decoded DCI in the PDCCH.

Uplink data transmissions are also dynamically scheduled using PDCCH. For example, similar to the downlink scenario, a UE first decodes an uplink grant in a DCI carried by PDCCH and then transmits data over the Physical Uplink Shared Channel (PUSCH) based the decoded control information in the uplink grant such as modulation order, coding rate, and uplink resource allocation, etc.

Each UE is assigned with a unique C-RNTI (Cell Radio Network Temporary Identifier) during network connection. The CRC (cyclic redundancy check) bits attached to a DCI for a UE may be scrambled by the UE's C-RNTI, so that a UE can recognize its own DCI by checking the CRC bits of the DCI against the assigned C-RNTI.

DCI Format for Scheduling PUSCH:

For UL scheduling of PUSCH, at least the following bit fields are included in a UL DCI:
  Frequency domain resource assignment
  Time domain resource assignment
  Modulation and coding scheme—5 bits
  New data indicator—1 bit
  Redundancy version—2 bits
  HARQ process number—4 bits
  TPC command for scheduled PUSCH—2 bits
  CSI request—0, 1, 2, 3, 4, 5, or 6 bits determined by higher layer parameter ReportTriggerSize DCI Format for Scheduling PDSCH:

For DL scheduling of PDSCH, at least the following bit fields are included in an DL DCI
  Frequency domain resource assignment
  Time domain resource assignment
  Modulation and coding scheme—5 bits
  New data indicator—1 bit
  Redundancy version—2 bits
  HARQ process number—4 bits
  ZP CSI-RS trigger—2 bits CSI Reporting Channel state information (CSI) feedback is used by gNB to obtain DL CSI from a UE in order to determine how to transmit DL data to a UE over plurality of antenna ports. The CSI typically includes a channel rank indicator (RI), a precoding matrix indicator(PMI), and a channel quality indicator (CQI). RI is used to indicate the number of data layers that can be transmitted simultaneously to a particular UE; PMI is used to indicate the precoding matrix over the indicated data layers; and CQI is used to indicate the modulation and coding rate that can be achieved with the indicated rank and the precoding matrix. A special type of CSI reporting is beam reporting, where the gNB transmits multiple CSI-RS resources in a plurality of beams and the UE feeds back a number of the strongest beams of the plurality of beams in the form of multiple CSI-RS resource indicators (CRIs) together with L1-RSRP (reference signal received power) for each selected resource.

In NR, in addition to periodic and aperiodic CSI reporting as in LTE, semi-persistent CSI reporting is also supported. Thus, three types of CSI reporting may be supported in NR as follows:

First, periodic CSI (P-CSI) Reporting on PUCCH. CSI is reported periodically by a UE. Parameters such as periodicity and slot offset are configured semi-statically by higher layer RRC signaling from the gNB to the UE Second, aperiodic CSI (A-CSI) Reporting on PUSCH. This type of CSI reporting involves a single-shot (i.e., one time) CSI report by a UE which is dynamically triggered by the gNB using DCI. Some of the parameters related to the configuration of the aperiodic CSI report is semi-statically configured by RRC but the triggering is dynamic Third, semi-persistent CSI (SP-CSI) Reporting on PUSCH. Similar to periodic CSI reporting, semi-persistent CSI reporting has a periodicity and slot offset which may be semi-statically configured. However, a dynamic trigger from a gNB to a UE may be needed to allow the UE to begin semi-persistent CSI reporting. A dynamic trigger from the gNB to the UE is needed to request the UE to stop the semi-persistent CSI reporting.

CSI Reference Signal (NZP CSI-RS)

Non-zero power (NZP) CSI-RS is used for measuring downlink CSI by a UE. CSI-RS is transmitted over each transmit (Tx) antenna port at the gNB and for different antenna ports, the CSI-RS are multiplexed in time, frequency, and code domains such that the channel between each Tx antenna port at the gNB and each receive antenna port at a UE can be measured by the UE. A time frequency resource used for transmitting CSI-RS may be referred to as a CSI-RS resource.

In NR, the following three types of CSI-RS transmissions are supported:

First, periodic CSI-RS (P CSI-RS): CSI-RS is transmitted periodically in certain slots. This CSI-RS transmission is semi-statically configured using parameters such as CSI-RS resource, periodicity and slot offset.

Second, aperiodic CSI-RS (AP CSI-RS). This is a one-shot CSI-RS transmission that can happen in any slot. Here, one-shot means that CSI-RS transmission only happens once per trigger. The CSI-RS resources within a slot (i.e., the resource element locations which consist of subcarrier locations and OFDM symbol locations) for aperiodic CSI-RS are semi-statically configured. The transmission of aperiodic CSI-RS is triggered by dynamic signaling through PDCCH using the CSI request field in UL DCI. Multiple aperiodic CSI-RS resources can be included in a CSI-RS resource set and the triggering of aperiodic CSI-RS is on a resource set basis. The slot offset of the CSI-RS relative to the triggering DCI is given by the RRC parameter aperiodicTriggering-Offset which is given on an CSI-RS resource set level.

Third, semi-persistent CSI-RS (SP CSI-RS). Similar to periodic CSI-RS, resources for semi-persistent CSI-RS transmissions are semi-statically configured with parameters such as periodicity and slot offset. However, unlike periodic CSI-RS, dynamic signaling is needed to activate and deactivate the CSI-RS transmission.

In the case of aperiodic CSI-RS and/or aperiodic CSI reporting, the gNB RRC configures the UE with $S\_c$ CSI triggering states. Each triggering state contains the aperiodic CSI report setting to be triggered along with the associated aperiodic CSI-RS resource sets.

CSI Frame Work in NR:

In NR, a UE can be configured with $N \geq 1$ CSI reporting settings (i.e., ReportConfigs), $M \geq 1$ resource settings (i.e., ResourceConfigs). At least the following configuration parameters may be signaled via RRC for CSI acquisition.

N, M, and L are indicated either implicitly or explicitly
In each CSI reporting setting, at least the followings are included:
  reported CSI parameter(s) such as RI, PMI, CQI
  CSI Type if reported such Type I or Type II
  Codebook configuration including codebook subset restriction
  Time-domain behavior such as P-CSI, SP-CSI, or A-CSI
  Frequency granularity for CQI and PMI such as wideband, partial band, or sub-band
  Measurement restriction configurations such as RBs in frequency domain and slots in time domain
  Carrier information, in case of cross carrier triggering
In each CSI-RS resource setting:
  A configuration of $S \geq 1$ CSI-RS resource set(s)
  A configuration of $Ks \geq 1$ CSI-RS resources for each resource set s, including at least: mapping to REs, the number of antenna ports, time-domain behavior, etc.
  Time domain behavior: aperiodic, periodic or semi-persistent A-CSI Reporting on PUSCH A-CSI reporting over PUSCH is triggered by a DCI for scheduling PUSCH, i.e., an UL DCI. A special CSI request bit field in the DCI is defined for the purpose. Each value of the CSI request bit field defines a codepoint and each codepoint can be associated with a higher layer configured CSI report trigger state. The first codepoint with all "0"s corresponds to a no CSI request. For A-CSI reporting, each of the $S_C$ triggering states comprise indication of one or more A-CSI reports to be triggered. Optionally, each triggered A-CSI report may also trigger aperiodic NZP CSI-RS resource sets for channel measurements, aperiodic CSI-IM and/or aperiodic NZP CSI-RS for interference measurements. Thus, each CSI report trigger state defines at least the following information:

Resource configurations
    CSI reference signal (CSI-RS) resource for channel measurement
    Interference measurement resource for interference measurement
CSI report configuration:
    The type of CSI report, i.e., wideband or sub-band, Type I or Type II codebook used, etc.

Figure 3:
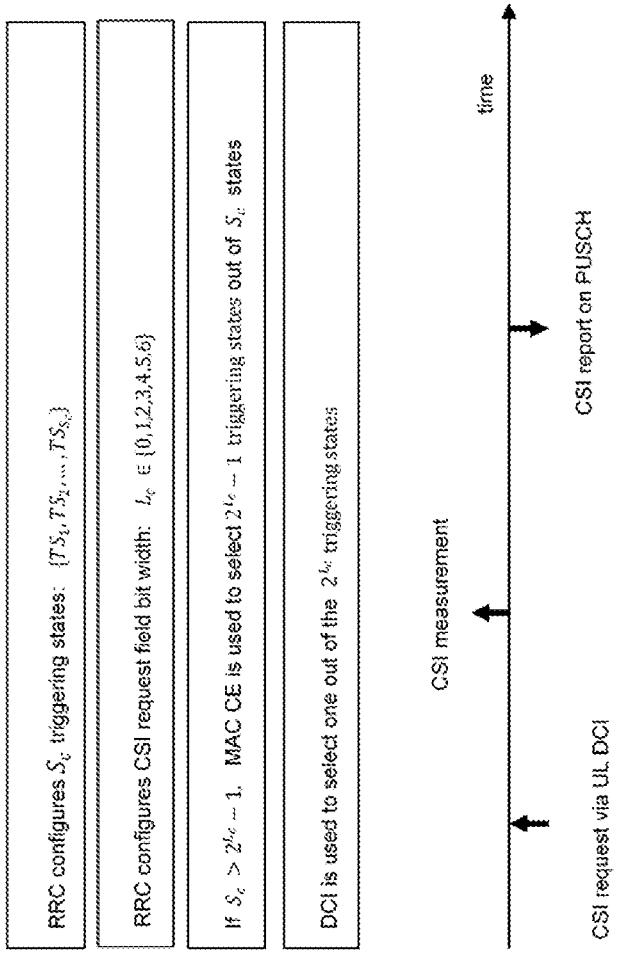
FIG. 3: Illustration of aperiodic CSI reporting.

The bit width, $L_c$, of the CSI request field is configurable from 0 to 6 bits. When the number of CSI triggering states, $S_c$, is larger than the number of codepoints, i.e., $S_c > 2^{L_c}-1$, MAC (Medium Access Control) CE (control element) is used to select a subset of $2^{L_c}-1$ triggering states from the $S_c$ triggering states so that there is a one-to-one mapping between each codepoint and a CSI triggering state. Some of these aspects may be seen in the illustration of aperiodic CSI reporting in FIG. 3.

There currently exist certain challenges. The current aperiodic CSI-RS triggering procedure in NR is not well-defined for the case where the DCI triggering the aperiodic CSI-RS and the aperiodic CSI-RS itself are transmitted on carriers or bandwidth parts which use different numerologies. For instance, it is not clear how to derive in which slot the aperiodic CSI-RS resource is transmitted due to the different numerologies resulting in different slot lengths and, therefore, different slot indexing. Another issue is that the aperiodic CSI-RS could be transmitted non-causally in case the CSI-RS subcarrier spacing (SCS) is larger than the PDCCH SCS, which would require a UE implementation to buffer OFDM symbols for several slots in the carrier with larger SCS in anticipation of potential aperiodic CSI-RS triggers in the carrier with the smaller SCS, which increases UE implementation complexity and memory consumption.

Certain aspects of the present disclosure and their embodiments may provide solutions to these or other challenges, decreasing UE implementation complexity and memory consumption. In this disclosure, a predefined rule is introduced to map the PDCCH reception slot in the numerology of the triggering PDCCH to a reference slot in the numerology of the CSI-RS such that the reference slot is the latest slot overlapping in time with PDCCH reception slot. The triggering offset of the aperiodic CSI-RS is then applied relative to the reference slot in the CSI-RS numerology.

Additionally, a restriction of aperiodic CSI-RS slot offset may be applied in the case where the PDCCH SCS is smaller than the aperiodic CSI-RS SCS, such that PDCCH decoding can be assured to be completed earlier in time than the occurrence of the aperiodic CSI-RS.

Figure 5:
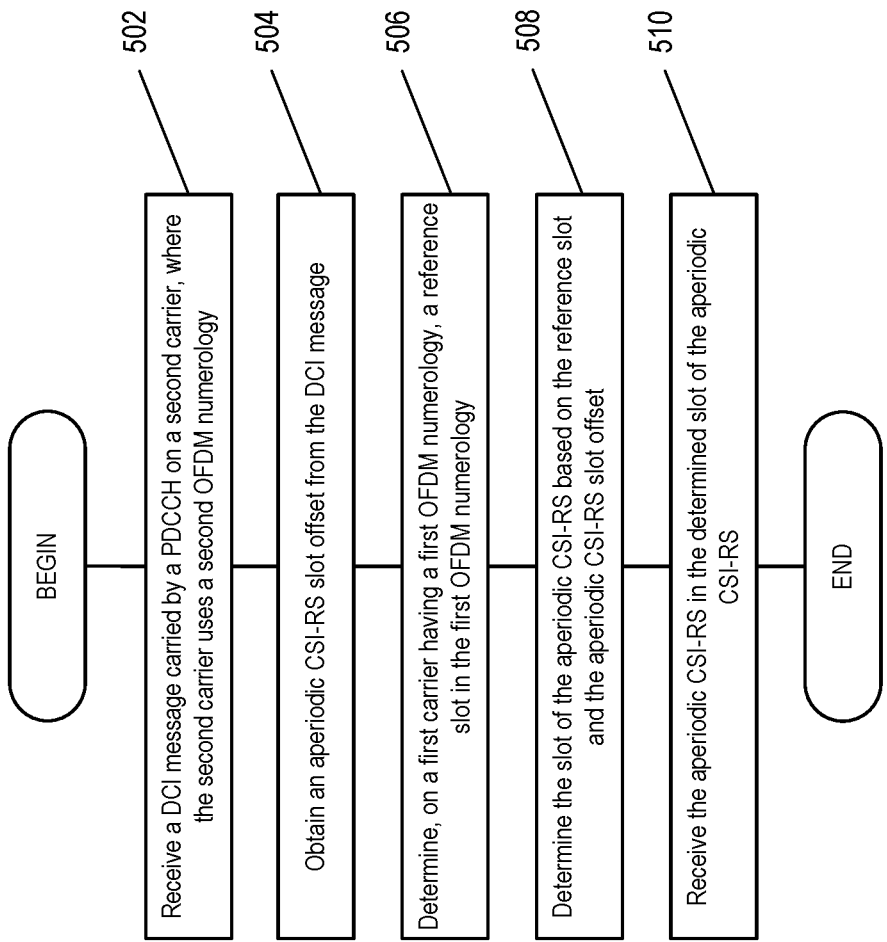
FIG. 5: Flow diagram illustrating an example method in a UE for receiving an aperiodic CSI-RS on a first carrier that uses a first OFDM numerology.

There are, proposed herein, various embodiments which address one or more of the issues disclosed herein. For example, FIG. 5 illustrates a method 500 according to some embodiments the present disclosure, performed by a wireless device, for receiving an aperiodic CSI-RS on a first carrier that uses a first OFDM numerology may include several operations. Such operations may include receiving a DCI message carried by a PDCCH) on a second carrier that uses a second OFDM numerology (operation 502), obtaining an aperiodic CSI-RS slot offset from the DCI message (operation 504), determining, on the first carrier, a reference slot in the first numerology (operation 506), determining the slot of the aperiodic CSI-RS based on the reference slot and the aperiodic CSI-RS slot offset (operation 508), and receiving the aperiodic CSI-RS in the determined slot of the aperiodic CSI-RS (operation 510). Additional embodiments of the method 500 may include additional operations beyond those enumerated in FIG. 5. For example, embodiments of the method 500 may include additional operations before, after, in between, or as part of the enumerated operations. Some embodiments of the method 500 include a set of instructions stored on a computer readable medium that can be executed by a processor to perform associated operations.

Certain embodiments may provide one or more of the following technical advantage. Aperiodic triggering of CSI-RS may be seamlessly supported irrespective of the numerology of the PDCCH and CSI-RS. Existing RRC configurations of aperiodic CSI-RS triggering offset can be reused for the mixed numerology aperiodic CSI-RS triggering case. By mapping the PDCCH reception slot to a reference slot in the CSI-RS numerology which is the latest overlapping slot, the number of OFDM symbols of the CIS-RS numerology the UE needs to buffer in anticipation of potential aperiodic CSI-RS triggering is minimized, which minimizes UE memory consumption and complexity.

The herein presented technology discloses a method for aperiodic CSI-RS triggering where the PDCCH carrying the triggering DCI is transmitted on a different carrier or bandwidth part than the triggered aperiodic CSI-RS, where additionally the carrier or bandwidth part of the PDCCH uses a different numerology than the carrier or bandwidth part whereon the aperiodic CSI-RS is transmitted. Here, numerology is equated to subcarrier spacing (SCS) and the SCSs may be represented with $\mu_{CSIRS}$ and $\mu_{PDCCH}$ respectively (corresponding to a SCS of $\Delta f=(15\times 2^\mu)$ kHz). The presented technology may provide a general solution applicable to all of the possible relationships between with $\mu_{CIRS}$ and $\mu_{PDCCH}$, i.e., $\mu_{CIRS} > \mu_{PDCCH}$, $\mu_{CSIRS} < \mu_{PDCCH}$, and $\mu_{CIRS} = \mu_{PDCCH}$.

In prior art solutions, only aperiodic CSI-RS triggering where the CSI-RS and triggering PDCCH have the same numerology have been considered. In such cases, it is relatively simple to determine the slot of the aperiodic CSI-RS as the slot X slots after the slot wherein the PDCCH is received. For example, if the PDCCH is received in slot n, the CSI-RS is transmitted in slot n+X, where X is the RRC configured aperiodic CSI-Rs slot offset. However, for the mixed numerology triggering case, it is ambiguous how to interpret such a slot offset.

The solutions presented in the present disclosure may rely on defining a predefined mapping between the PDCCH reception slot in the numerology of the PDCCH to a reference slot n' in the numerology of the CSI-RS. The indicated slot offset X in is then mapped to a slot a n'+X in the numerology of the CSI-RS.

In some embodiments, the reference slot n' is a slot overlapping in time with the slot of the PDCCH. For instance, the latest slot in the numerology of the CSI-RS overlapping in time with the slot of the PDCCH is determined as the reference slot. Alternatively, the first slot in the numerology of the CSI-RS overlapping in time with the slot of the PDCCH is determined as the reference slot (or more generally, a pre-determined slot).

In another embodiment, a slot not overlapping in time is selected as the reference slot, such as the first slot in the CSI-RS numerology not overlapping in time with the reference slot. The term "overlapping slot" includes two concepts. In one embodiment the slot timing of the two carriers/bandwidth parts as received by the UE is used to determine if slots are overlapping. In another embodiment, the UE compensates for any potential receive timing difference before determining the reference slot, i.e., first slot in a subframe of both numerologies have same start time. The two carriers could be transmitted by non co-located base stations or transmission points and, thus, the propagation delays are different resulting in different receive times.

In some embodiments, the UE may implicitly determine the reference slot as part of the procedure for determining the slot of the aperiodic CSI-RS, i.e., it may use the reference slot as an intermediate calculation in the process of determining the aperiodic CSI-RS slot and may not determiner the reference slot explicitly.

In one example, the reference slot may be determined as $$n' = \left\lfloor (n+1) \frac{2^{\mu_{CSIRS}}}{2^{\mu_{PDCCH}}} - 1 \right\rfloor,$$

where n is the slot of the triggering PDCCH. The slot counters n and n' are typically re-started at every subframe boundary. This would map the reference slot as:

the latest slot overlapping with the PDCCH slot in case $\mu_{CIRS} > \mu_{PDCCH}$,
the same slot as the PDCCH in case $\mu_{CIRS} = \mu_{PDCCH}$, and,
the overlapping slot of the PDCCH slot in case $\mu_{CIRS} < \mu_{PDCCH}$, which is desirable.

Figure 4:
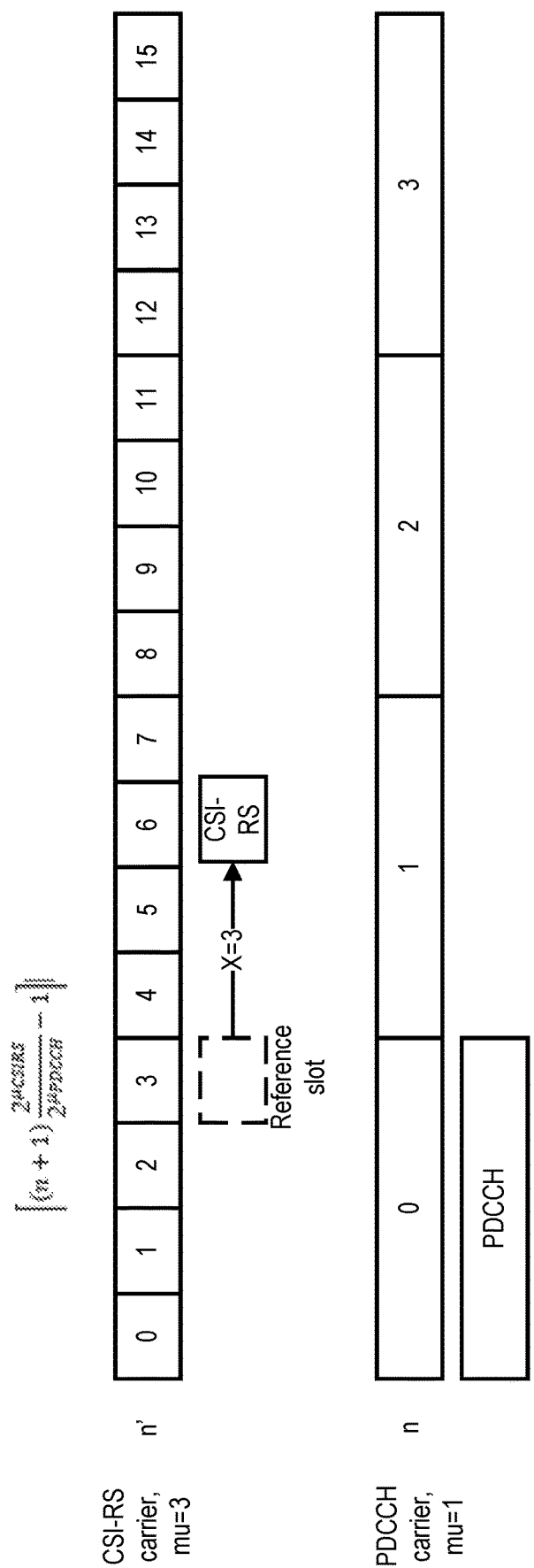
FIG. 4: Illustration of mixed numerology triggering of aperiodic CSI-RS according to the method.

An illustration of the above example is given in FIG. 4.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In one embodiment, a restriction on the slot offset X is imposed when $\mu_{CSIRS} > \mu_{PDCCH}$, such that the aperiodic slot offset must be larger than some value, for instance zero. Enforcing a non-zero slot offset assures that the aperiodic CSI-RS is always transmitted after PDCCH reception is complete, which removes the need for the UE to buffer OFDM symbols on the CSI-RS carrier in anticipation of a potential aperiodic CSI-RS trigger on the PDCCH carrier.

In another embodiment the slot offset X is scaled based on the numerology ratio, i.e., CSI-RS is transmitted in slot $$n' = n + \frac{2^{\mu_{CSIRS}}}{2^{\mu_{PDCCH}}} X,$$

with n the reference slot as determined above and X the indicated slot offset. Using the scaled X instead of X directly could be limited to case $\mu_{CIRS} > \mu_{PDCCH}$. Slots with higher $\mu$ values are shorter, so the scaling compensates for that and guarantees the UE has sufficient time.

Using the specification language of TS 38.214, the herein presented method may be implemented as follows:

When aperiodic CSI-RS is used with aperiodic reporting, the CSI-RS offset X is configured per resource set by the higher layer parameter aperiodicTriggeringOffset. The CSI-RS triggering offset has the range of 0 to 4 slots. The UE shall transmit a CSI report or receive the CSI-RS in slot $$\left\lfloor (n+1) \frac{2^{\mu_{CSIRS}}}{2^{\mu_{PDCCH}}} - 1 \right\rfloor + X,$$

where n is the slot with the triggering DCI in the numerology of the PDCCH, X is the CSI-RS triggering offset in the numerology of CSI-RS according to the higher layer parameter aperiodicTriggeringOffset, and $\mu_{CSIRS}$ and $\mu_{PDCCH}$ are the subcarrier spacing configurations for CSI-RS and PDCCH, respectively. If all the associated trigger states do not have the higher layer parameter qcl-Type set to 'QCL-TypeD' in the corresponding TCI states, the CSI-RS triggering offset is fixed to zero. If the PDCCH SCS is smaller than the CSI-RS SCS, the CSI-RS triggering offset is larger than zero. The aperiodic triggering offset of the CSI-IM follows offset of the associated NZP CSI-RS for channel measurement.

For CSI-RS resource sets associated with Resource Settings configured with the higher layer parameter resource-Type set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request per slot. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot. A UE is not expected to be triggered with a CSI report for a non-active DL BWP. A trigger state is initiated using the CSI request field in DCI.

When all the bits of CSI request field in DCI are set to zero, no CSI is requested.

When the number of configured CSI triggering states in CSI-AperiodicTriggerStateList is greater than $2^{N_{TS}}-1$, where $N_{TS}$ is the number of bits in the DCI CSI request field, the UE receives a selection command [10, TS 38.321] used to map up to $2^{N_{TS}}-1$ trigger states to the codepoints of the CSI request field in DCI. $N_{TS}$ is configured by the higher layer parameter reportTriggerSize where $N_{TS} \in \{0,1,2,3,4,5,6\}$. When the HARQ/ACK corresponding to the PDSCH carrying the selection command is transmitted in the slot n, the corresponding action in [10, TS 38.321] and UE assumption on the mapping of the selected CSI trigger state(s) to the codepoint(s) of DCI CSI request field shall be applied starting from slot $n+3N_{slot}^{subframe,\mu}+1$.

When the number of CSI triggering states in CSI-AperiodicTriggerStateList is less than or equal to $2^{N_{TS}}-1$, the CSI request field in DCI directly indicates the triggering state For each aperiodic CSI-RS resource in a CSI-RS resource set associated with each CSI triggering state, the UE is indicated the quasi co-location configuration of quasi co-location RS source(s) and quasi co-location type(s), as described in Subclause 5.1.5, through higher layer signaling of qcl-info which contains a list of references to TCI-State's for the aperiodic CSI-RS resources associated with the CSI triggering state. If a State referred to in the list is configured with a reference to an RS associated with 'QCL-TypeD', that RS may be an SS/PBCH block located in the same or different CC/DL BWP or a CSI-RS resource configured as periodic or semi-persistent located in the same or different CC/DL BWP.

If the scheduling offset, in the numerology of the aperiodic CSI-RS, between the last symbol of the PDCCH carrying the triggering DCI and the first symbol of the aperiodic CSI-RS resources in a NZP-CSI-RS-ResourceSet configured without higher layer parameter trs-Info and without the higher layer parameter repetition is smaller than the UE reported threshold beamSwitchTiming, as defined in [13, TS 38.306], when the reported value is one of the values of {14, 28, 48}, if there is any other DL signal with an indicated TCI state in the same symbols as the CSI-RS, the UE applies the QCL assumption of the other DL signal also when receiving the aperiodic CSI-RS. The other DL signal refers to PDSCH scheduled with offset larger than or equal to the threshold timeDurationForQCL, as defined in [13, TS 38.306], aperiodic CSI-RS scheduled with offset larger than or equal to the UE reported threshold beamSwitchTiming when the reported values is one of the values {14,28,48}, periodic CSI-RS, semi-persistent CSI-RS.

If the scheduling offset, in the numerology of the aperiodic CSI-RS, between the last symbol of the PDCCH carrying the triggering DCI and the first symbol of the aperiodic CSI-RS resources is equal to or greater than the UE reported threshold beamSwitchTiming when the reported value is one of the values of {14,28,48}, the UE is expected to apply the QCL assumptions in the indicated TCI states for the aperiodic CSI-RS resources in the CSI triggering state indicated by the CSI trigger field in DCI.

A non-zero codepoint of the CSI request field in the DCI is mapped to a CSI triggering state according to the order of the associated positions of the up to $2^{N_{TS}}-1$ trigger states in CSI-AperiodicTriggerStateList with codepoint '1' mapped to the triggering state in the first position.

For a UE configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one CSI-IM/NZP CSI-RS resource set from the Resource Setting.

When aperiodic CSI-RS is used with aperiodic reporting, the CSI-RS offset X is configured per resource set by the higher layer parameter aperiodicTriggeringOffset. The CSI-RS triggering offset has the range of 0 to 4 slots. The UE shall transmit the CSI-RS in slot $$\left[(n+1)\frac{2^{\mu_{CSIRS}}}{2^{\mu_{PDCCH}}} - 1\right] + X,$$

where n is the slot with the triggering DCI in the numerology of the PDCCH, X is the CSI-RS triggering offset in the numerology of CSI-RS according to the higher layer parameter aperiodicTriggeringOffset, and $\mu_{CIRS}$ and $\mu_{PDCCH}$ are the subcarrier spacing configurations for CSI-RS and PDCCH, respectively. If all the associated trigger states do not have the higher layer parameter qcl-Type set to 'QCL-TypeD' in the corresponding TCI states, the CSI-RS triggering offset is fixed to zero. If the PDCCH SCS is smaller than the CSI-RS SCS, the CSI-RS triggering offset is larger than zero. The aperiodic triggering offset of the CSI-IM follows offset of the associated NZP CSI-RS for channel measurement.

The UE does not expect that aperiodic CSI-RS is transmitted before the OFDM symbol(s) carrying its triggering DCI. If interference measurement is performed on aperiodic NZP CSI-RS, a UE is not expected to be configured with a different aperiodic triggering offset of the NZP CSI-RS for interference measurement from the associated NZP CSI-RS for channel measurement. If the UE is configured with a single carrier for uplink, the UE is not expected to transmit more than one aperiodic CSI report triggered by different DCIs on overlapping OFDM symbols.

Figure 6:
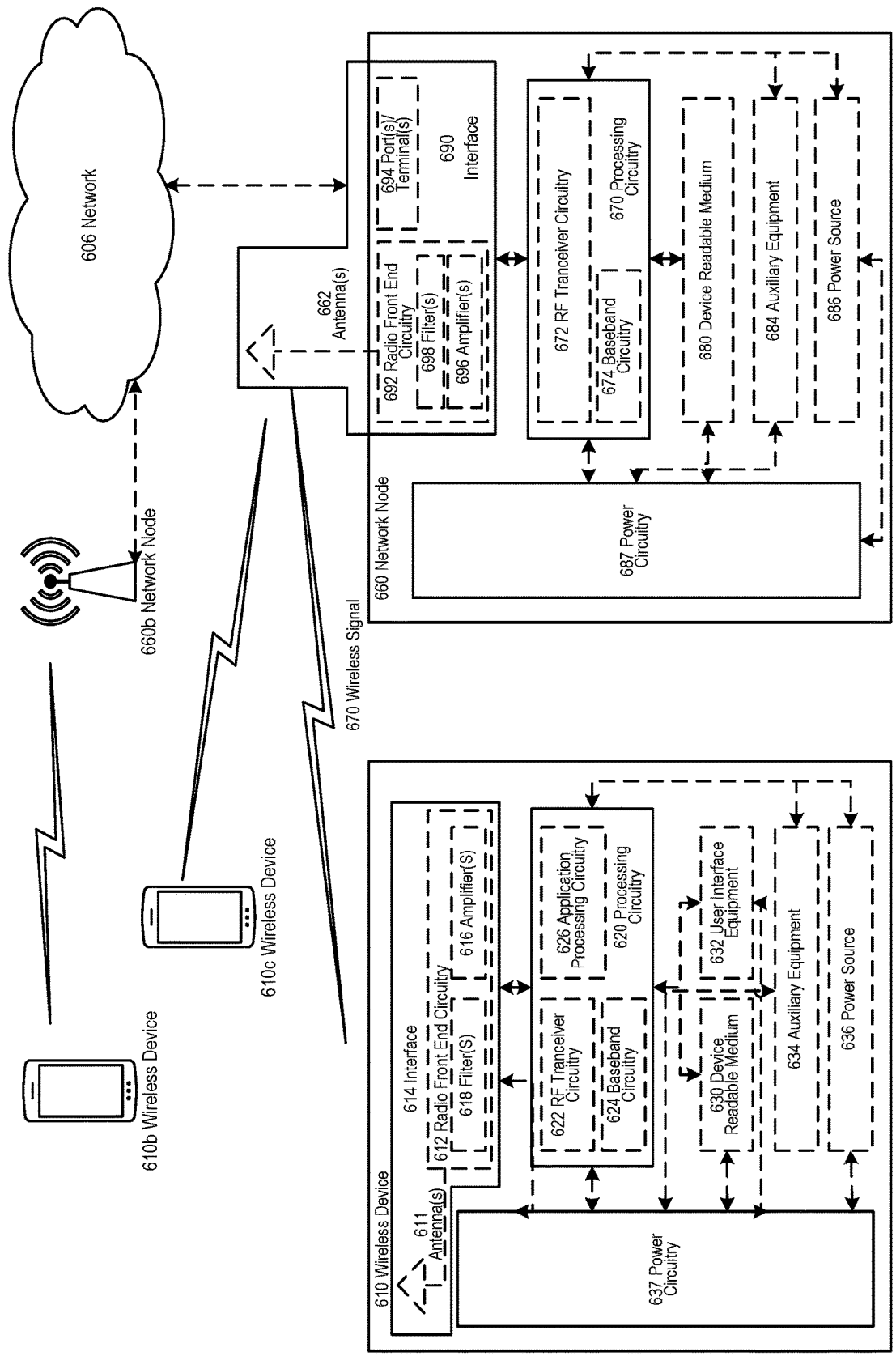
FIG. 6: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
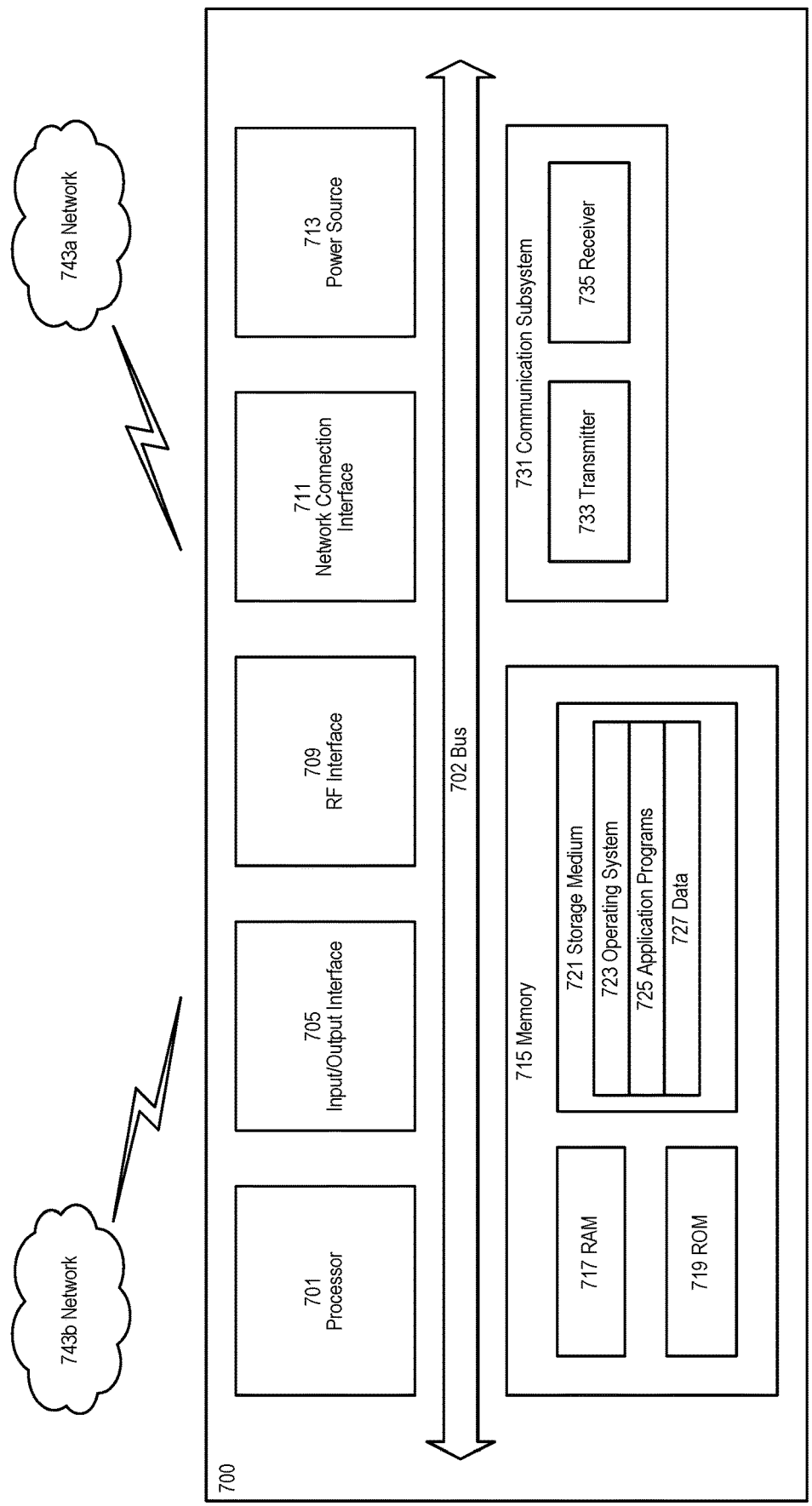
FIG. 7: User Equipment in accordance with some embodiments.

FIG. 7 illustrates one embodiment of a UE 700 in accordance with various aspects described herein. For example, the UE 700 may perform embodiments of the method 500 and provide other features as described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
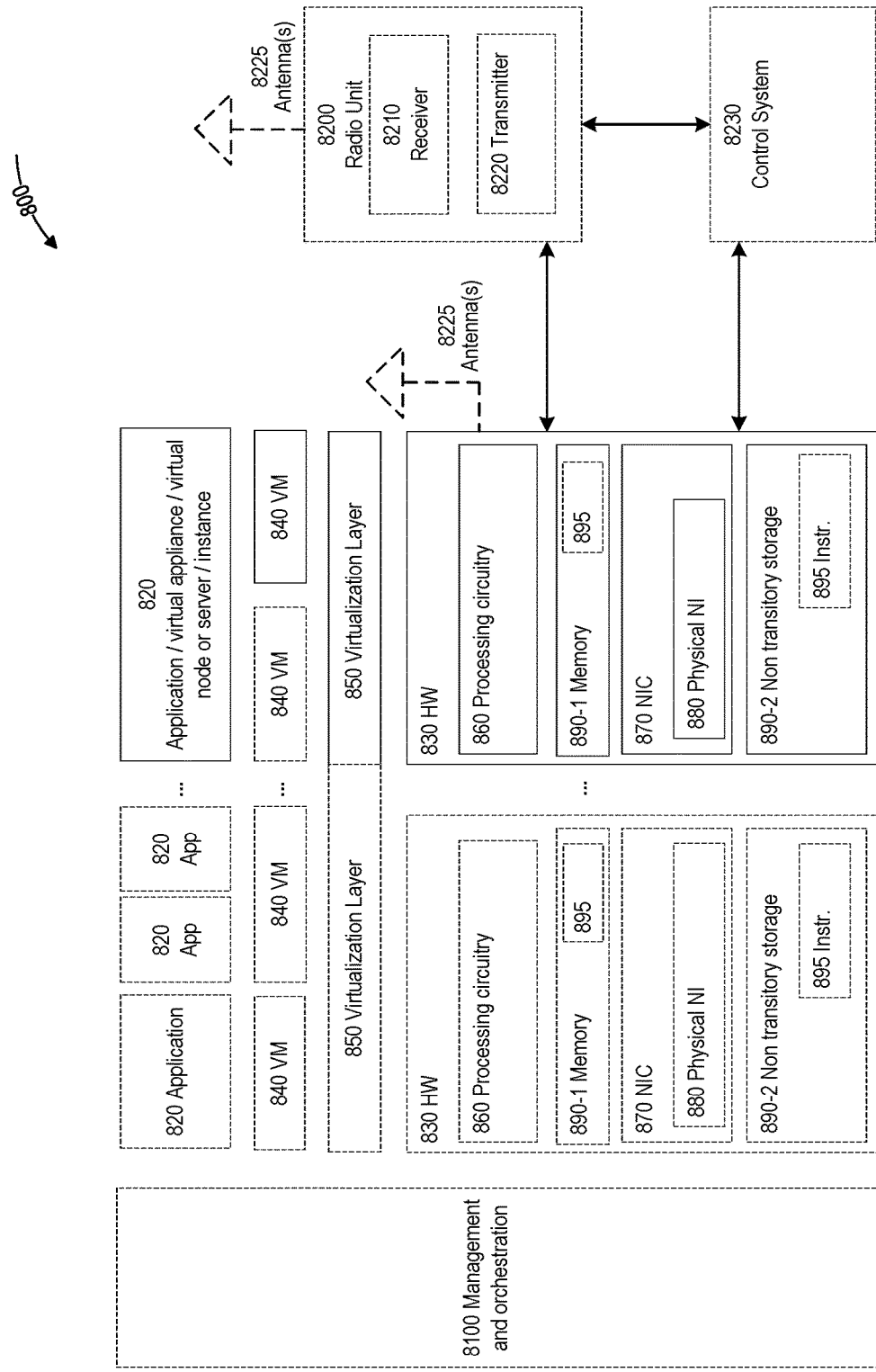
FIG. 8: Virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
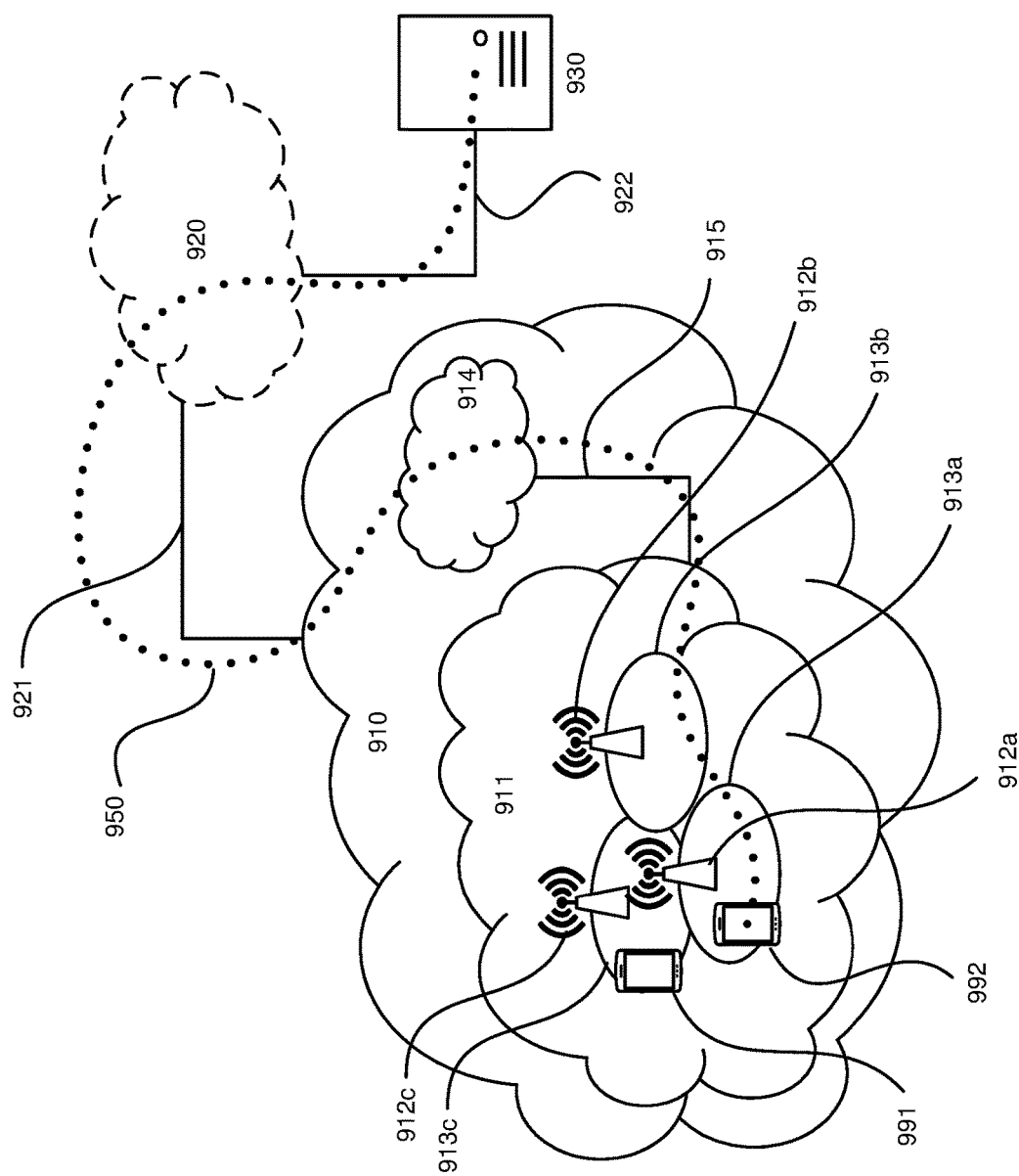
FIG. 9: Telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
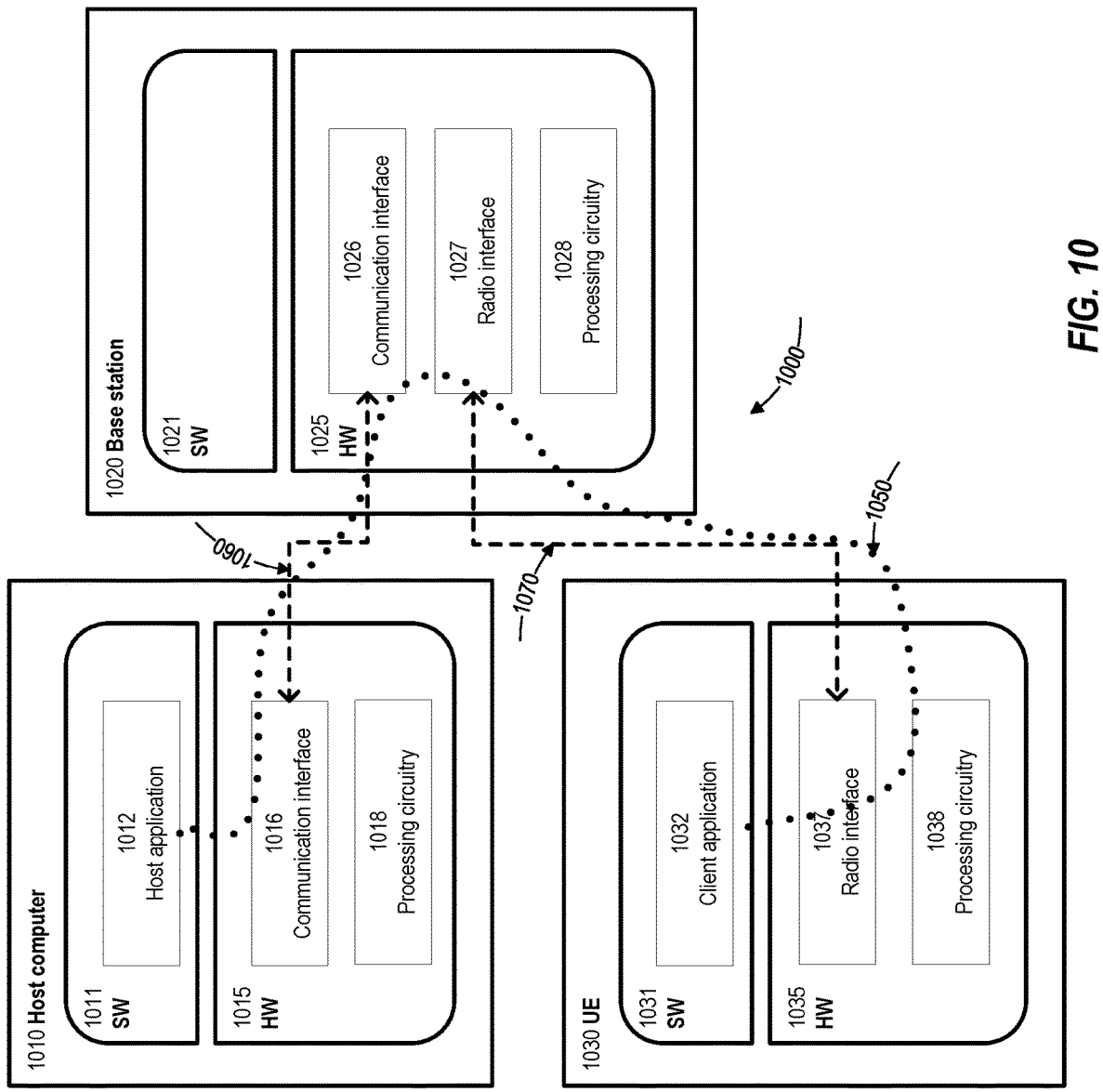
FIG. 10: Host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the operation and performance of a UE using the OTT connection 1050 to access OTT services.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors, etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method, performed by a wireless device, for receiving an aperiodic channel state information reference signal (CSI-RS) on a first carrier, where the first carrier uses a first orthogonal frequency division multiplexing (OFDM) numerology, the method comprising,
receiving a downlink control information (DCI) message carried by a Physical Downlink Control Channel (PDCCH) on a second carrier, wherein the second carrier uses a second OFDM numerology;
obtaining an aperiodic CSI-RS slot offset from the DCI message;
determining a reference slot in the first numerology;
determining the slot of the aperiodic CSI-RS based on the reference slot and the aperiodic CSI-RS slot offset; and
receiving or transmitting the aperiodic CSI-RS in the determined slot.

2. The method of claim 1, wherein the first OFDM numerology is different from the second OFDM numerology.

3. The method of claim 1, wherein the OFDM numerology is characterized by its subcarrier spacing.

4. The method of claim 1, where additionally the wireless device transmits a Channel State Information (CSI) report based on a measurement of the received aperiodic CSI-RS.

5. The method of claim 1, wherein the slot of the aperiodic CSI-RS is determined as the slot X slots later than the reference slot, where X is the aperiodic CSI-RS slot offset.

6. The method of claim 1, wherein determining the slot of the aperiodic CSI-RS based on the reference slot and the aperiodic CSI-RS slot offset comprises calculating a slot $$\left[(n+1)\frac{2^{\mu_{CSIRS}}}{2^{\mu_{PDCCH}}} - 1\right] + X,$$

wherein:
n is the slot with the triggering DCI in the numerology of the PDCCH,
X is the CSI-RS triggering offset in the numerology of CSI-RS according to the higher layer parameter aperiodicTriggeringOffset, and
$\mu_{CSIRS}$ and $\mu_{PDCCH}$ are the subcarrier spacing configurations for CSI-RS and PDCCH, respectively.

7. A user equipment (UE) for receiving an aperiodic channel state information reference signal (CSI-RS) on a first carrier, where the first carrier uses a first orthogonal frequency division multiplexing (OFDM) numerology, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform operations comprising:
receiving a downlink control information (DCI) message carried by a Physical Downlink Control Channel (PDCCH) on a second carrier, wherein the second carrier uses a second OFDM numerology;
obtaining an aperiodic CSI-RS slot offset from the DCI message;
determining, on the first carrier, a reference slot in the first numerology;
determining the slot of the aperiodic CSI-RS based on the reference slot and the aperiodic CSI-RS slot offset; and
receiving the aperiodic CSI-RS in the determined slot of the aperiodic CSI-RS or transmitting an associated CSI-RS report in the determined slot; and
a battery connected to the processing circuitry and configured to supply power to the UE.

8. The user equipment of claim 7, wherein the first OFDM numerology is different from the second OFDM numerology.

9. The user equipment of claim 7, wherein the OFDM numerology is characterized by its subcarrier spacing.

10. The user equipment of claim 7, where the wireless device transmits a Channel State Information (CSI) report based on a measurement of the received aperiodic CSI-RS.

11. The method of claim 1, wherein the slot of the aperiodic CSI-RS is determined as the slot X slots later than the reference slot, where X is the aperiodic CSI-RS slot offset.

12. The method of claim 1, wherein determining the slot of the aperiodic CSI-RS based on the reference slot and the aperiodic CSI-RS slot offset comprises calculating a slot $$\left[(n+1)\frac{2^{\mu_{CSIRS}}}{2^{\mu_{PDCCH}}} - 1\right] + X,$$

wherein:
n is the slot with the triggering DCI in the numerology of the PDCCH,
X is the CSI-RS triggering offset in the numerology of CSI-RS according to the higher layer parameter aperiodicTriggeringOffset, and
$\mu_{CSIRS}$ and $\mu_{PDCCH}$ are the subcarrier spacing configurations for CSI-RS and PDCCH, respectively.

13. A communication system comprising:
processing circuitry configured to provide user data; and a communication interface configured to forward the user data to a cellular network for transmission to a user equipment (UE), wherein the cellular network comprises at least a first base station and a second base station, the first and second base stations having radio interfaces and processing circuitry, wherein the first base station transmits via a first carrier and the second base station transmits via a second carrier the processing circuitry being configured to:

transmit a downlink control information (DCI) message carried by a Physical Downlink Control Channel (PDCCH) on the first carrier, wherein the DCI message includes an aperiodic CSI-RS slot offset;

transmitting the aperiodic CSI-RS in the determined slot of the aperiodic CSI-RS on the second carrier according to an aperiodic CSI-RS slot offset.

14. The communication system of claim 13, wherein the first base station and the second base station are non-collocated base stations.

15. The communication system of claim 13, further including the UE, wherein the UE is configured to communicate with the base station.

16. A method, performed by a base station, for transmitting an aperiodic channel state information reference signal (CSI-RS) on a first carrier, the method comprising, transmitting a downlink control information (DCI) message carried by a Physical Downlink Control Channel (PDCCH) on a second carrier, wherein the DCI message includes an aperiodic CSI-RS slot offset;

transmitting the aperiodic CSI-RS in the determined slot of the aperiodic CSI-RS according to the aperiodic CSI-RS slot offset.

17. The method of claim 16, wherein the first carrier uses a first OFDM numerology and the second carrier uses a second OFDM numerology that is different than the first OFDM numerology.

18. The method of claim 17, wherein the first OFDM numerology and the second OFDM numerology are characterized by respective subcarrier spacings.

19. The method of claim 16, further comprising receiving, from a wireless device, a Channel State Information (CSI) report based on a measurement of the received aperiodic CSI-RS.

20. The method of claim 16, wherein the slot of the aperiodic CSI-RS is determined as the slot X slots later than the reference slot, where X is the aperiodic CSI-RS slot offset.

* * * * *

UNITED STATES PATENT AND TRADEMARK OFFICE
CERTIFICATE OF CORRECTION

| | |
|---|---|
| PATENT NO. | : 12,004,210 B2 |
| APPLICATION NO. | : 17/298890 |
| DATED | : June 4, 2024 |
| INVENTOR(S) | : Sebastian Faxér, Sorour Falahati and Robert Baldemair |

It is certified that error appears in the above-identified patent and that said Letters Patent is hereby corrected as shown below:

In the Drawings

In Fig. 6, Sheet 6 of 11, for Tag "672", Line 1, delete "Tranceiver" and insert -- Transceiver --, therefor.

In Fig. 6, Sheet 6 of 11, for Tag "618", Line 1, delete "Filter(S)" and insert -- Filter(s) --, therefor.

In Fig. 6, Sheet 6 of 11, for Tag "616", Line 1, delete "Amplifier(S)" and insert -- Amplifier(s) --, therefor.

In Fig. 6, Sheet 6 of 11, for Tag "622", Line 1, delete "Tranceiver" and insert -- Transceiver --, therefor.

In the Specification

In Column 1, Line 8, delete "filed" and insert -- filed on --, therefor.

In Column 1, Line 53, delete "(i.e.," and insert -- i.e., --, therefor.

In Column 2, Line 25, delete "Physical" and insert -- Physical Downlink --, therefor.

In Column 4, Line 54, delete "though UE" and insert -- UE --, therefor.

In Column 4, Line 61, delete "the" and insert -- on the --, therefor.

In Column 5, Line 17, delete "DCI" and insert -- DCI: --, therefor.

In Column 5, Line 50, delete "UE" and insert -- UE. --, therefor.

In Column 5, Line 56, delete "dynamic" and insert -- dynamic. --, therefor.

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,004,210 B2

In Column 6, Line 48, delete "such" and insert -- such as --, therefor.

In Column 6, Line 61, delete "set s," and insert -- sets, --, therefor.

In Column 7, Line 15, delete "measurement" and insert -- measurement. --, therefor.

In Column 7, Line 17, delete "measurement" and insert -- measurement. --, therefor.

In Column 7, Line 64, delete "the" and insert -- of the --, therefor.

In Column 8, Line 1, delete "PDCCH)" and insert -- PDCCH --, therefor.

In Column 8, Lines 41-43, delete "with µCIRS and µPDCCH, i.e., µCIRS>µPDCCH, µCSIRS<µPDCCH, and µCIRS=µPDCCH." and insert -- µCSIRS and µPDCCH, i.e., µCSIRS>µPDCCH, µCSIRS<µPDCCH, and µCSIRS=µPDCCH. --, therefor.

In Column 8, Line 58, delete "in is" and insert -- is --, therefor.

In Column 9, Line 32, delete "µCIRS>µPDCCH," and insert -- µCSIRS>µPDCCH, --, therefor.

In Column 9, Line 33, delete "µCIRS=µPDCCH," and insert -- µCSIRS=µPDCCH, --, therefor.

In Column 9, Line 35, delete "µCIRS<µPDCCH," and insert -- µCSIRS<µPDCCH, --, therefor.

In Column 9, Line 63, delete "µCIRS>µPDCCH." and insert -- µCSIRS>µPDCCH. --, therefor.

In Column 10, Line 63, delete "state" and insert -- state. --, therefor.

In Column 11, Line 64, delete "µCIRS" and insert -- µCSIRS --, therefor.

In Column 14, Line 53, delete "units" and insert -- units. --, therefor.

In Column 17, Line 14, delete "(CPE)." and insert -- (CPE), --, therefor.

In Column 17, Line 32, delete "etc.)" and insert -- etc.), --, therefor.

In Column 20, Line 56, delete "interchangeable." and insert -- interchangeably. --, therefor.

In Column 24, Lines 1-2, delete "memory 890. Memory 890" and insert -- memory 890-1. Memory 890-1 --, therefor.

In Column 29, Line 26, delete "according" and insert -- according to --, therefor.

In Column 29, Line 45, delete "Carrier Component" and insert -- Component Carrier --, therefor.

CERTIFICATE OF CORRECTION (continued)
U.S. Pat. No. 12,004,210 B2

In Column 29, Line 47, delete "Code Division Multiplexing Access" and insert -- Code Division Multiple Access --, therefor.

In Column 29, Line 48, delete "Cell Global Identifier" and insert -- Cell Global Identity --, therefor.

In Column 29, Line 54, delete "information" and insert -- Indicator --, therefor.

In Column 30, Line 3, delete "E-SMLC evolved Serving Mobile Location Center".

In Column 30, Line 42, delete "Profile" and insert -- Power --, therefor.

In Column 30, Line 44, delete "Packet Gateway" and insert -- Packet Data Network Gateway --, therefor.

In Column 30, Line 47, delete "Precoder Matrix Indicator" and insert -- Precoding Matrix Indicator --, therefor.

In Column 30, Line 57, delete "Radio Link Management" and insert -- Radio Link Monitoring --, therefor.

In Column 31, Line 11, delete "Self Optimized Network" and insert -- Self-Organizing Network --, therefor.

In Column 31, Line 26, delete "Wide" and insert -- Wideband --, therefor.

In Column 31, Line 27, delete "Wide" and insert -- Wireless --, therefor.

In the Claims

In Column 31, Line 33, in Claim 1, delete "comprising," and insert -- comprising: --, therefor.

In Column 31, Line 33, in Claim 12, delete "receiving or transmitting," and insert -- receiving --, therefor.

In Column 33, Line 25, in Claim 16, delete "comprising," and insert -- comprising: --, therefor.